(No Model.)
A. C. McEWEN.
CONVERTIBLE SAW SETTING AND JOINTING DEVICE.
No. 340,802. Patented Apr. 27, 1886.
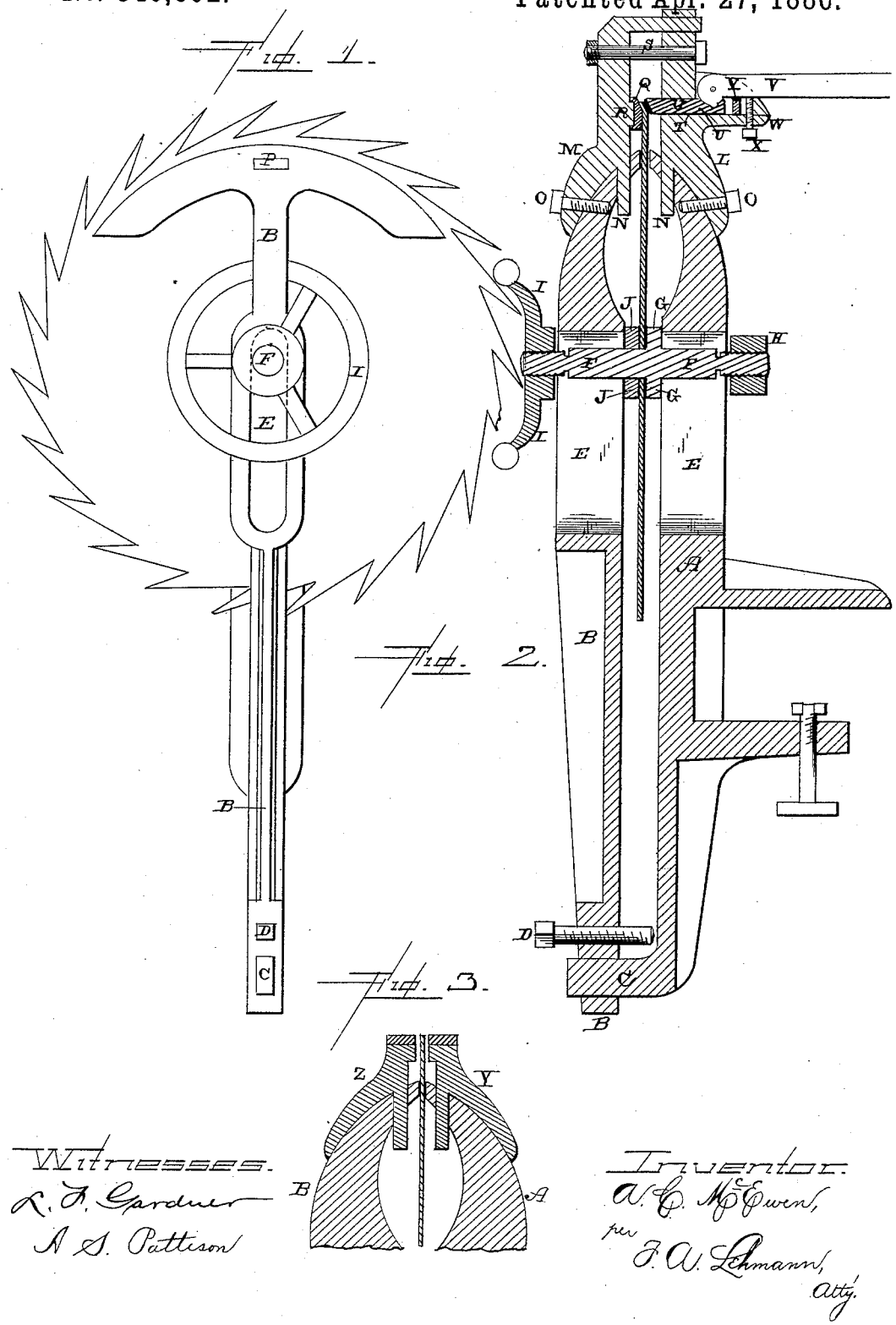

UNITED STATES PATENT OFFICE.

ADDISON C. McEWEN, OF JERSEY CITY, NEW JERSEY.

CONVERTIBLE SAW SETTING AND JOINTING DEVICE.

SPECIFICATION forming part of Letters Patent No. 340,802, dated April 27, 1886.

Application filed March 6, 1886. Serial No. 194,237. (No model.)

*To all whom it may concern:*

Be it known that I, ADDISON C. McEWEN, of Jersey City, in the county of Hudson and State of New Jersey, have invented certain new and useful Improvements in Saw Setting and Jointing Machines; and I do hereby declare the following to be a full, clear, and exact description of the invention, such as will enable others skilled in the art to which it pertains to make and use it, reference being had to the accompanying drawings, which form part of this specification.

My invention relates to an improvement in saw setting and jointing machines; and it consists in, first, the combination of the two jaws provided with vertical slots in which the clamping-rod, which binds the two jaws together and holds the saw at the same time, is made vertically adjustable with a set-screw which is passed through the lower end of one of the jaws for the purpose of regulating the distance between their lower ends, which are loosely connected together; second, the combination, with the two jaws between which the saw is held, of the setting mechanism, which is rigidly attached to the upper ends of the jaws, as will be more fully described hereinafter.

The object of my invention is to provide a saw set and jointer which is equally adapted to saws of different sizes, and in which the jaws between which the saw is held is adapted to receive both the setting and the jointing mechanism.

Figure 1 is a side elevation of the jaws alone, having the saw placed between them. Fig. 2 is a vertical section of both the setting mechanism and the jaws. Fig. 3 is a detail view showing the jointing mechanism.

A B represent two jaws, either of the form here shown or any other which may be preferred, and which are secured to any suitable support by means of a clamp, which is secured to the lower portion of the jaw A. Upon the lower end of the jaw A is formed a projection, C, which passes through a corresponding opening in the lower end of the jaw B, for the purpose of supporting the jaw B in position and allowing their lower ends to be freely adjusted back and forth in relation to each other. Passing through the lower end of the jaw B, just above the projection C, is a set-screw, D, by means of which the distance the lower ends of the two jaws A B shall approach each other is regulated. This set-screw D is used for the purpose of regulating the distance that the upper ends of the jaws A B shall be made to approach each other. Owing to the flange and the nut, which are placed upon opposite sides of the saw and against which the inner sides of these jaws strike, the distance that the upper ends of the jaws shall approach each other for the purpose of regulating the amount of set that is given to the teeth is regulated by the set-screw D. If but a small amount of set is to be given to the teeth of the saw, the set-screw will be moved so as to allow the lower ends of the jaws to approach each other, and at the same time the upper ends of the jaws are forced apart. When the teeth of the saw are to be given the full amount of set that the machine is capable of giving, then the lower ends of the jaws are forced apart so as to bring their upper ends in close contact with the sides of the saw.

Each one of the jaws A B has a vertical slot, E, made through it, and through these slots is passed the clamping-bolt F, which is made screw-threaded at each of its ends, and provided with a flange, G, near its center. This flange is wider than the slots E, and hence prevents any movement of the parts after it has been tightened in place by the nut H upon its end. Upon the opposite end from the nut H is placed the hand-wheel I, by means of which the two jaws A B are clamped together. Upon this rod F is placed a circular saw of any desired size. If the saw is a large one, the rod F is dropped downward in the slots so that the upper teeth of the saw will project the desired distance above the upper ends of the jaws, as shown in Fig. 1. In proportion to the size of the saw the rod F is adjusted vertically in the slots, and thus the same jaws are adapted to saws of different sizes.

By means of the nut H the rod F can be tightly clamped to the jaw A, so as to remain in any position into which it has been adjusted. Before the saw can be placed upon the rod F the hand-wheel I and the jaw B must be entirely removed, and then, after the saw has been placed in position, they are returned to place.

It is not necessary to use the washer J when only the jaws A B are used by themselves; but when the set-works are applied to the upper ends of the jaws the washer J is slipped over the end of the rod F, so as to come between the saw and the inner side of the jaw B. This washer J then serves as a fulcrum upon which the jaw B moves when the distance between the upper ends of the jaw is adjusted. If the saw is to be simply filed, the jaws A B alone are used. When the teeth of the saw are to be set, then the washer J is used, and the set-works are applied to the upper ends of the jaws.

The two jaws L M of the set-works are each provided with a tenon, N, which passes down through the socket formed in the upper portion of each jaw, and then the two parts L M are secured to the jaws A B by means of set-screws O, as shown in Fig. 2. A socket, P, is made in the upper end of each of the jaws, and in which the tenon N fits, and is made elongated, as shown in Fig. 1, and the tenons N are made of a corresponding shape. Secured to the jaw M is a flange or projection, R, upon which the anvil Q is placed. This anvil Q consists of a steel block, preferably of the shape shown, and against the beveled outer side of which the teeth of the saw are set. The upper end of the jaw M forms a tenon, which passes through a corresponding mortise which is made in the upper horizontal portion of the jaw L.

In order to still more firmly connect the jaws L M together, so that there may be no variation whatever in the amount of set which is given to the teeth, the clamping-rod S is passed through the two jaws, as shown. These jaws being held rigidly in position at their lower ends and clamped rigidly together at their upper ends, they have no movement whatever, and hence the set of every tooth is absolutely the same.

Through the jaw L is made a horizontal opening, T, and in this opening is placed the die U, which is operated by the lever V. In order to form a support for this die U as it moves back and forth, a flange, W, is formed on the outer side of the jaw L, and through this flange W is passed the set-screw X, and upon the top of the jaw is placed a block of rubber, Y. The set-screw serves to regulate the distance that the lever shall be forced downward and the distance the die U shall be moved, while the rubber Y serves as a cushion for the purpose of throwing the lever upward after coming in contact with the upper end of the set-screw X. As the jaws A B do not clamp the saw between them, it can be freely turned upon the rod F, so as to bring the teeth alternately in position to be set.

When the saw is to be jointed, the two jaws L M are removed from the tops of the jaws A B, and the two jaws Y Z are substituted for them. The washer J having been removed, the upper ends of the two jaws can be brought together, so as to hold the saw rigidly in place while the file is being used. Upon each one of these jaws Y Z is placed a block of glass, which may either be inserted in the tops of the jaws or simply placed upon their upper ends, as may be preferred. These blocks of glass serve as gages for the file. As soon as the file comes in contact with the blocks of glass, the operator stops filing.

Having thus described my invention, I claim—

1. The combination of the jaws A B, provided with vertical slots and having their lower ends connected loosely together, with the set-screw D, the rod F, provided with a flange, and suitable clamping devices, substantially as shown.

2. The combination of the two jaws A B, having vertical slots E, and having their lower ends adjustably connected together, the set-screw D, the rod F, provided with a flange, and suitable clamping devices, the washer J, placed upon the rod F, the two jaws of the set mechanism, and the die and lever connected therewith, substantially as described.

3. The combination of the two jaws L M with the two jaws A B, upon which they are placed, each one of the jaws L M being provided with tenon N, set-screw O, the clamping-bolt S, the die U, anvil Q, lever V, and set-screw X, substantially as set forth.

4. The combination, with the jaws A B and adjusting devices thereof, of the interchangeable jaws M L Y Z, substantially as described.

In testimony whereof I affix my signature in presence of two witnesses.

ADDISON C. McEWEN.

Witnesses:
FRANK PEARSON,
D. D. CLARK.